(12) United States Patent
Suzuki

(10) Patent No.: US 6,513,132 B1
(45) Date of Patent: Jan. 28, 2003

(54) SOFTWARE AUTOMATIC DISTRIBUTION SYSTEM

(75) Inventor: Masaki Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/307,561

(22) Filed: May 10, 1999

(30) Foreign Application Priority Data

May 12, 1998 (JP) .......................................... 10-128643

(51) Int. Cl.⁷ .................................................. H02H 3/05
(52) U.S. Cl. .......................................... 714/38; 714/47
(58) Field of Search ............................. 714/11, 38, 39, 714/47; 707/1, 11, 10

(56) References Cited

U.S. PATENT DOCUMENTS

| | | | | |
|---|---|---|---|---|
| 5,247,683 A | * | 9/1993 | Holmes et al. ............. | 709/221 |
| 5,390,256 A | * | 2/1995 | Mandell et al. ............. | 381/77 |
| 5,530,802 A | * | 6/1996 | Fuchs et al. ................. | 714/17 |
| 5,835,911 A | * | 11/1998 | Nakagawa et al. ......... | 707/203 |
| 5,903,762 A | * | 5/1999 | Sakamoto et al. ......... | 395/712 |
| 6,014,740 A | * | 1/2000 | Shearer, Jr. ................. | 712/233 |
| 6,052,724 A | * | 4/2000 | Willie et al. ................. | 709/223 |
| 6,317,742 B1 | * | 11/2001 | Nagaratnam et al. ......... | 707/9 |

FOREIGN PATENT DOCUMENTS

JP 946342 2/1997

* cited by examiner

*Primary Examiner*—Dieu-Minh Le
(74) *Attorney, Agent, or Firm*—Leydig, Voit & Mayer, Ltd.

(57) ABSTRACT

In a software automatic distribution system, alternate machine information is registered in an alternate machine list in a storage section for each of machines arranged hierarchically. When software is attempted to be distributed from the management machine to another machine, if the software distribution fails, the management machine reads alternative machine information corresponding to the machine where the software distribution has failed, from an alternate machine list, and distributes the software to the alternate machine.

3 Claims, 7 Drawing Sheets

| DESTINATION | LEVEL 0 | LEVEL 1 | LEVEL 2 | LEVEL 3 |
|---|---|---|---|---|
| MACHINE 2 : | MACHINE 1 → | MACHINE 2 | | |
| MACHINE 3 : | MACHINE 1 → | MACHINE 3 | | |
| MACHINE 4 : | MACHINE 1 → | MACHINE 2 → | MACHINE 4 | |
| MACHINE 5 : | MACHINE 1 → | MACHINE 2 → | MACHINE 5 | |
| MACHINE 6 : | MACHINE 1 → | MACHINE 2 → | MACHINE 6 | |
| MACHINE 7 : | MACHINE 1 → | MACHINE 3 → | MACHINE 7 | |
| MACHINE 8 : | MACHINE 1 → | MACHINE 3 → | MACHINE 8 | |
| MACHINE 9 : | MACHINE 1 → | MACHINE 2 → | MACHINE 5 → | MACHINE 9 |
| MACHINE 10 : | MACHINE 1 → | MACHINE 2 → | MACHINE 5 → | MACHINE 10 |

FIG. 3A

| DESTINATION | LEVEL 0 | LEVEL 1 | LEVEL 2 | LEVEL 3 |
|---|---|---|---|---|
| MACHINE 4 | : MACHINE 1 → | MACHINE 2 → | MACHINE 4 | |
| MACHINE 5 | : MACHINE 1 → | MACHINE 3 → | MACHINE 5 | |
| MACHINE 9 | : MACHINE 1 → | MACHINE 2 → | MACHINE 5 → | MACHINE 9 |

FIG. 3B

| DESTINATION | LEVEL 0 | LEVEL 1 | LEVEL 2 |
|---|---|---|---|
| MACHINE 4 | : MACHINE 2 → | MACHINE 4 | |
| MACHINE 5 | : MACHINE 2 → | MACHINE 5 | |
| MACHINE 9 | : MACHINE 2 → | MACHINE 5 → | MACHINE 9 |

FIG. 3C

| DESTINATION | LEVEL 0 | LEVEL 1 |
|---|---|---|
| MACHINE 9 | : MACHINE 5 → | MACHINE 9 |

FIG. 4A  MACHINE 1, MACHINE 2, ..., MACHINE N

FIG. 4B  MACHINE 4, MACHINE 5, MACHINE 9

FIG. 5  MACHINE 1, MACHINE 2, ..., MACHINE N

FIG. 6A  MACHINE 1, MACHINE 2, ..., MACHINE N

FIG. 6B  MACHINE 2

FIG. 6C  MACHINE 4, MACHINE 5

FIG. 6D  MACHINE 9

FIG. 7  MACHINE 2 → MACHINE 4

FIG. 8
```
MACHINE 2  → MACHINE 4
MACHINE 3  → MACHINE 8
MACHINE 8  → MACHINE 7
MACHINE 7  → MACHINE 3
MACHINE 4  → MACHINE 5
MACHINE 5  → MACHINE 6
MACHINE 6  → MACHINE 9
MACHINE 9  → MACHINE 10
MACHINE 10 → MACHINE 9
```

| MACHINE 2 |

FIG. 12

| DESTINATION | LEVEL 0 | LEVEL 1 | LEVEL 2 | LEVEL 3 |
|---|---|---|---|---|
| MACHINE 4 | : MACHINE 1 → | MACHINE 4 | | |
| MACHINE 5 | : MACHINE 1 → | MACHINE 4 → | MACHINE 5 | |
| MACHINE 9 | : MACHINE 1 → | MACHINE 4 → | MACHINE 5 → | MACHINE 9 |

FIG. 13

| DESTINATION | LEVEL 0 | LEVEL 1 | LEVEL 2 |
|---|---|---|---|
| MACHINE 5 | : MACHINE 4 → | MACHINE 5 | |
| MACHINE 9 | : MACHINE 4 → | MACHINE 5 → | MACHINE 9 |

FIG. 14

| MACHINE 5 |

FIG. 15

| DESTINATION | LEVEL 0 | LEVEL 1 | LEVEL 2 |
|---|---|---|---|
| MACHINE 5 | : MACHINE 4 → | MACHINE 5 | |
| MACHINE 9 | : MACHINE 4 → | MACHINE 5 → | MACHINE 9 |

FIG. 16

| DESTINATION | LEVEL 0 | LEVEL 1 |
|---|---|---|
| MACHINE 9 | : MACHINE 5 → | MACHINE 9 |

FIG. 17

MACHINE 9

FIG. 18

| DESTINATION | LEVEL 0 | LEVEL 1 |
|---|---|---|
| MACHINE 9 | : MACHINE 5 → | MACHINE 9 |

SOFTWARE AUTOMATIC DISTRIBUTION SYSTEM

BACKGROUND OF THE INVENTION

1. Field of the Invention

This invention relates to a software automatic distribution system for distributing software to at least any one of machines arranged hierarchically at several levels and, more particularly, to a software automatic distribution system which can dynamically change a software distribution route for automatically continuing software distribution processing.

2. Description of the Related Art

Hitherto, in a hierarchical software automatic distribution system wherein a plurality of machines are arranged hierarchically at several levels and software is distributed from one of the machines, when software distribution to a machine at an intermediate level of the hierarchy ended in failure for some cause, to continue the software distribution to the machines at lower levels than the machine where the software distribution ended in failure, the machine at the intermediate level has been recovered from the failure manually before the software distribution is again executed, or the distribution route has been changed manually so as to make a detour to avoid the machine before the software distribution is again executed.

In the hierarchical software automatic distribution system in the related art as described above, if software distribution to a machine at an intermediate level of the hierarchy ends in failure for some cause, the machine at the intermediate level is recovered from the failure manually before the software distribution is again executed, or the distribution route is changed manually so as to make a detour to avoid the machine before the software distribution is again executed. Thus, in either case, manual labor is required and, for example, if it is necessary to complete software distribution by the specified time, manual monitoring is required until the software distribution is complete, to guard against the occurrence of a fault. This monitoring adds time to software distribution so the hierarchical software automatic distribution system involves a problem in efficient software distribution.

SUMMARY OF THE INVENTION

It is therefore an object of the invention to provide a software automatic distribution system for dynamically changing a software distribution route for automatically continuing the software distribution process when software distribution to a machine at an intermediate level ends in failure for some cause, whereby software distribution can be executed in a short time, efficiently, without manual labor for fault recovery or distribution route change or fruitless manual monitoring.

According to a first aspect of the invention, there is provided a software automatic distribution system for distributing software to machines arranged hierarchically at several levels, the software automatic distribution system comprising alternate machine information storage means for storing alternate machine information to distribute software to the alternate machine corresponding to a second machine if software distribution results in failure when software is distributed from a first machine to the second machine, and software distribution means for distributing software based on the alternate machine information corresponding to the second machine read from the alternate machine information storage means if software distribution results in failure when software is distributed from the first machine to the second machine.

In a second aspect of the invention, the software automatic distribution system as set forth in the first aspect of the invention further includes distribution result information notification means for sending distribution result information indicating that software distribution ended in failure from the second machine to the first machine if software distribution results in failure when software is distributed from the first machine to the second machine and software distribution fault detection means for detecting software distribution fault based on the received distribution result information.

In a third aspect of the invention, the software automatic distribution system as set forth in the first aspect of the invention further includes software distribution fault determination means for determining software distribution fault to occur if distribution result information is not sent to the first machine within a predetermined time when software is distributed from the first machine to the second machine.

DETAILED DESCRIPTION OF THE INVENTION

Referring now to the accompanying drawings, there is shown a preferred embodiment of the invention.

First Embodiment

First, the terms relevant to description of an embodiment of the invention, (a) hierarchical distribution, (b) management machine, (c) route information master, (d) destination route information, (e) destination list, (f) fault machine list, (g) intermediate destination list, and (h) alternate machine list, are defined.

(a) Hierarchical Distribution

Figure 1:
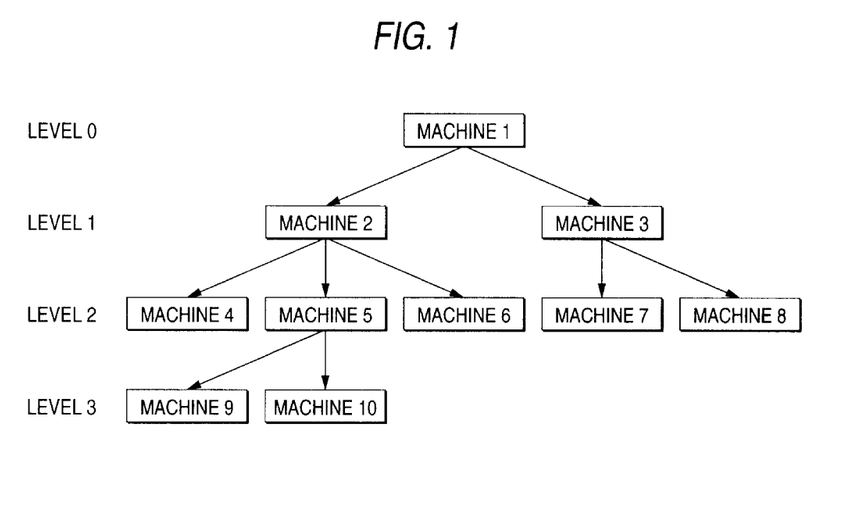
FIG. 1 shows a hierarchical distribution.

FIG. 1 shows a hierarchical distribution.

The hierarchical distribution refers to a method of distributing software via machines at several levels as shown in FIG. 1 rather than distributing software from one machine directly to all other machines when software is distributed to a plurality of machines. It is a method of distributing software to a plurality of machines arranged hierarchically at several levels, but may be a method of distributing software only to the machines at the bottom level or to all machines on the distribution route; in short, the hierarchical distribution may be distribution of software to any machine on the distribution route. It may be distribution of software to one of the machines arranged hierarchically at several levels.

(b) Management Machine

The management machine refers to the machine at the top level for managing hierarchical distribution; in the example in FIG. 1, a machine 1 at level 0 corresponds to the management machine.

(c) Route Information Master

Figure 2:
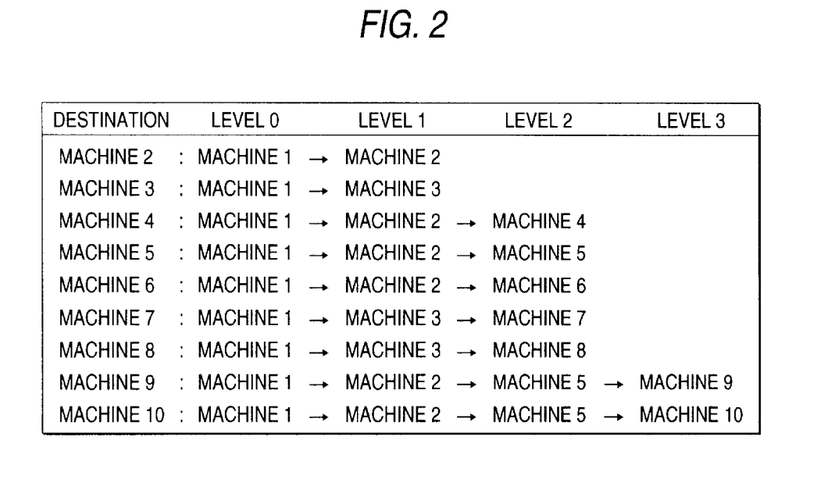
FIG. 2 shows a route information master.

FIG. 2 shows a route information master.

The route information master refers to route information of the whole distribution system in the whole hierarchy in the static initial state defined only in the management machine; the example in FIG. 1 is the route information master of the management machine 1. For example, if software is to be distributed to a machine 10, the distribution route becomes machine 1→machine 2→machine 5→machine 10, namely, software is distributed from the machine 1 via the machines 2 and 5 to the machine 10.

(d) Destination Route Information

Figure 3A:
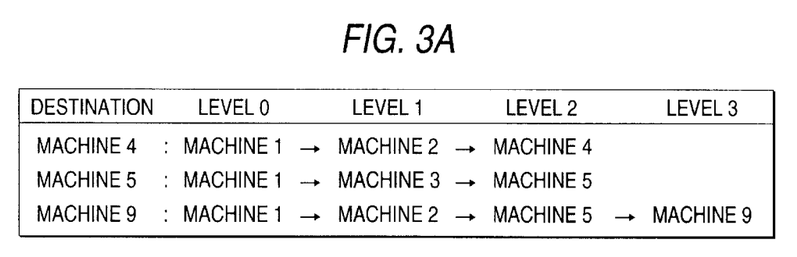
FIGS. 3A to 3C show destination route information.
Figure 3B:
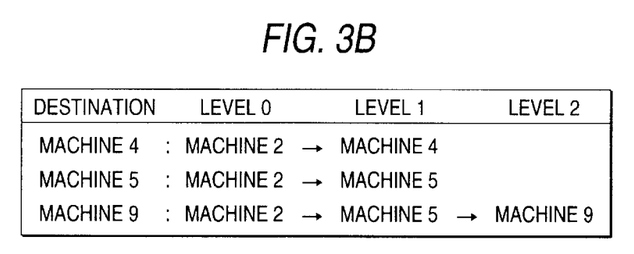
Figure 3C:
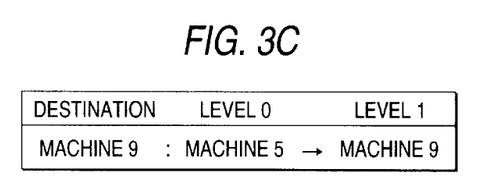

FIGS. 3A to 3C show destination route information.

When attention is focused on one machine, the destination route information refers to route information of hierarchical distribution with the machine at the top level. However, the record of the machine and the records of the machines to which software is not distributed are not contained. The destination route information is defined in the management machine and is distributed at the same time as software and after distribution, an unnecessary record is deleted at the machine to which software is distributed. If a fault in which software cannot be distributed normally occurs, the destination route information is corrected in accordance with an alternate machine list described later.

For example, to distribute software to the machines 4, 5, and 9 in the system hierarchy as in FIG. 1, the destination route information with the machine 1 at the top level becomes as shown in FIG. 3A. For example, when the destination is the machine 9 and the machine 1 is at the top level, the destination route information becomes machine 1→machine 2→machine 5→machine 9.

To distribute software to the machines 4, 5, and 9, the destination route information with the machine 2 at the top level becomes as shown in FIG. 3B. For example, when the destination is the machine 9 and the machine 2 is at the top level, the destination route information becomes machine 2→machine 5→machine 9. To distribute software to the machines 4, 5, and 9, the destination route information with the machine 5 at the top level becomes machine 5→machine 9 as shown in FIG. 3C. At this time, the destination route information is not prepared in any machine other than the machine 1, 2, or 5 at the top level.

(e) Destination List

Figure 4A:
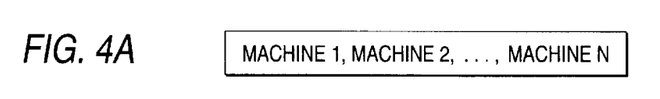
FIGS. 4A and 4B show destination lists.
Figure 4B:
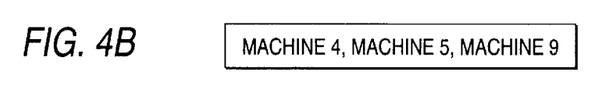

FIGS. 4A and 4B show destination lists.

The destination list refers to a list where the machine names of the destination machines to which software is to be distributed are described. It is used in the management machine, namely, is used when destination route information is prepared in the management machine from the route information master. Generally, the machine names of the destination machines to which software is to be distributed are described in order, as shown in FIG. 4A. For example, to distribute software to the machines 4, 5, and 9, the machine names of the machines 4, 5, and 9 are described in the destination list, as shown in FIG. 4B.

The destination route information is used as destination information as the software is distributed, and has the same function as the destination list in each machine. For example, in FIG. 3A, software is to be distributed to the machines 4, 5, and 9 from the viewpoint of the machine 1; in FIG. 3B, software is to be distributed to the machines 4, 5, and 9 from the viewpoint of the machine 2; and in FIG. 3C, software is to be distributed to the machine 9 from the viewpoint of the machine 5.

(f) Fault Machine List

Figure 5:
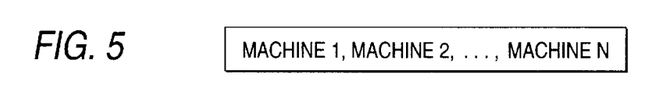
FIG. 5 shows a fault machine list.

FIG. 5 shows a fault machine list.

The fault machine list refers to a list where the machine names of the machines to which software cannot be distributed because of some fault are described. It is used in the management machine and the machine names of the machines to which software cannot be distributed are listed regardless of whether or not the machines are the destinations. Generally, the machine names of the machines to which software cannot be distributed are described as shown in FIG. 5. The case where the destination machine is not powered on and communication cannot be made, the case where the network is disconnected and communication cannot be made, the case where the disk of the destination machine is full and software cannot be distributed as a result, etc., can be named as the fault. The fault machine list can be periodically seen for checking to see if a fault occurs in the destination machine.

(g) Intermediate Destination List

FIGS. 6A to 6D show intermediate destination lists.

Figure 6A:
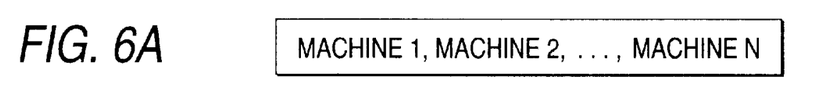
FIGS. 6A to 6D are drawings show intermediate destination lists.

When attention is focused on one machine, the intermediate destination list refers to a list of the machine names of the machines to which software is distributed directly from the noted machine to distribute software to destination machines. The intermediate destination list is prepared in the noted machine by extracting the machine names at level 1 in the destination route information. Generally, the machine names of the machines to which software is distributed directly from the noted machine are described in the intermediate destination list, as shown in FIG. 6A.

Figure 6B:
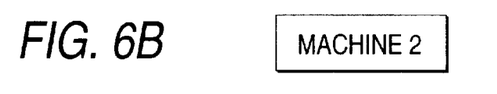
Figure 6C:
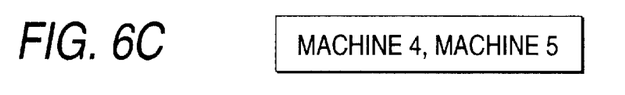
Figure 6D:
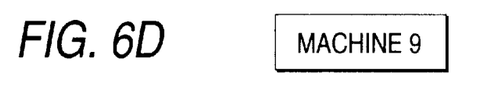

For example, to distribute software to the machines 4, 5, and 9, the intermediate destination list with attention focused on the machine 1 contains machine 2 as shown in FIG. 6B. For example, to distribute software to the machines 4, 5, and 9, the intermediate destination list with attention focused on the machine 2 contains machine 4 and machine 5 as shown in FIG. 6C. For example, to distribute software to the machines 4, 5, and 9, the intermediate destination list with attention focused on the machine 5 contains machine 9 as shown in FIG. 6D. The management machine distributes software based on the route information master and each machine to which the software is distributed then distributes the software to the machines at the next level based on the intermediate destination list.

(h) Alternate Machine List

Figure 7:
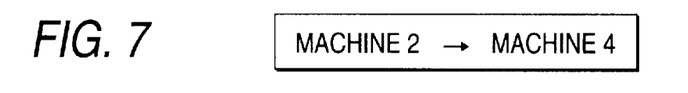
FIG. 7 shows an alternate machine list.

FIG. 7 show an alternate machine list.

The alternate machine list refers to information for specifying alternate machines to distribute software to the machines at lower levels if some fault occurs in an intermediate destination machine or the network and software cannot be distributed. The alternate machine list assumes that alternate machines are defined for all machines other than the management machine. For example, if the alternate machine of the machine 2 is the machine 4, the alternate machine list becomes machine 2→machine 4 as shown in FIG. 7.

An embodiment will be discussed wherein although an attempt was made to distribute software to the machines 4, 5, and 9 in the system hierarchy in FIG. 1, software distribution to the machine 2 ended in failure, thus the machine 4 is selected as an alternate machine out of the alternate machine list for continuing the processing.

Figure 8:
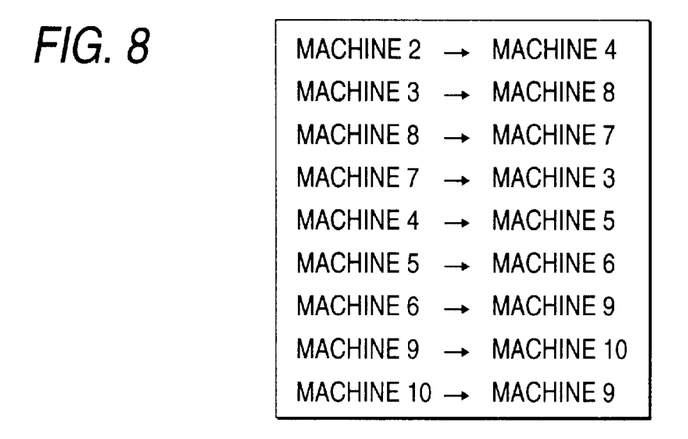
FIG. 8 shows an alternate machine list used with a software automatic distribution system of a first embodiment according to the invention.

In the embodiment, the route information master previously described with reference to FIG. 2 is used as the route information master and is stored in a storage section contained in the management machine 1, the list previously described with reference to FIG. 4B is used as the destination list because software is to be distributed to the machines 4, 5, and 9, and a list shown in FIG. 8 is used as the alternate machine list. Information for specifying the machine 4 as the alternative machine used when fault occurs in the intermediate destination machine 2 is described in the alternate machine list in FIG. 8. In the alternate machine list, alternate machines are defined for all machines other than the management machine.

Figure 9:
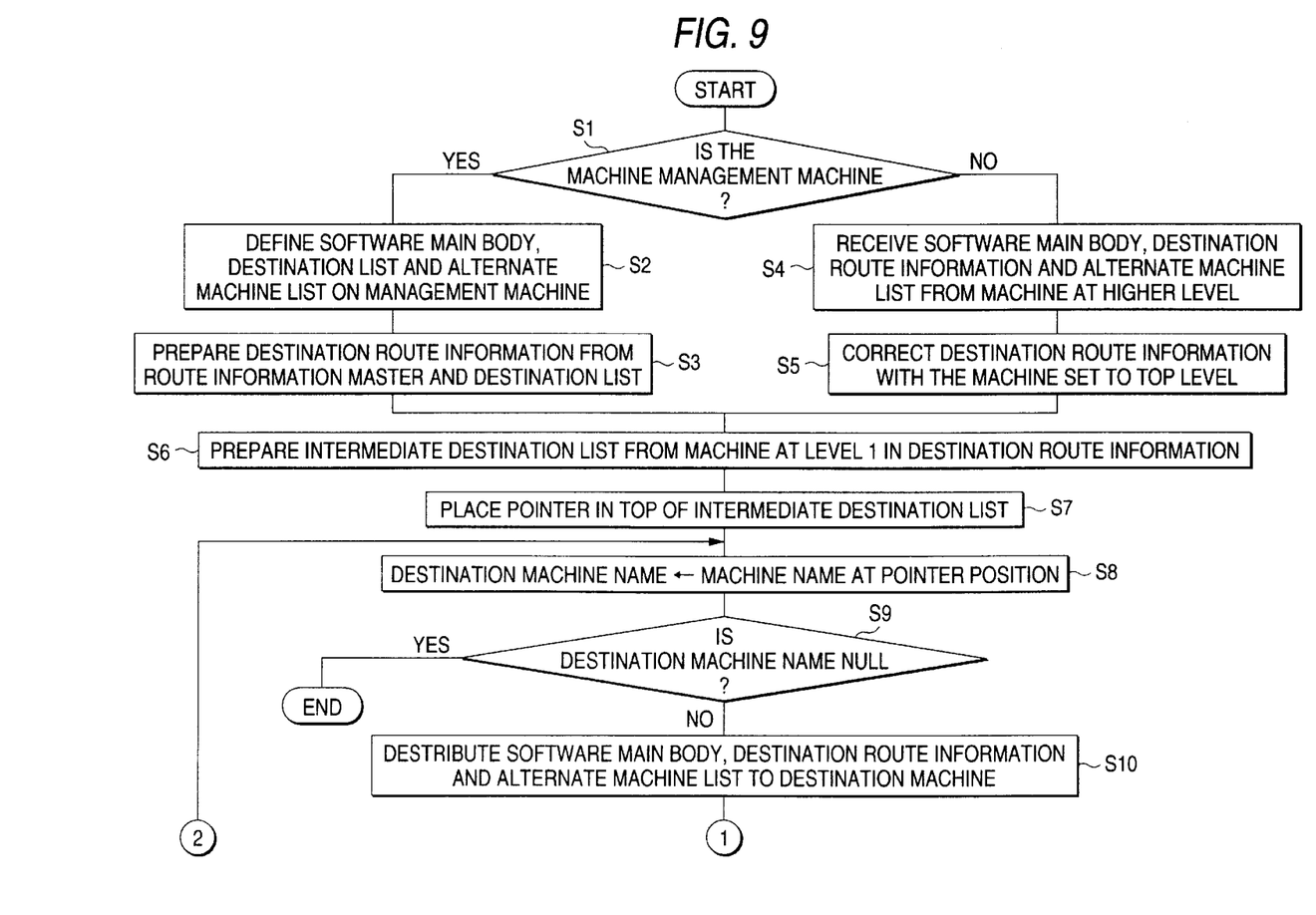
FIG. 9 is a flowchart showing a processing flow of the software automatic distribution system of the first embodiment according to the invention.
Figure 10:
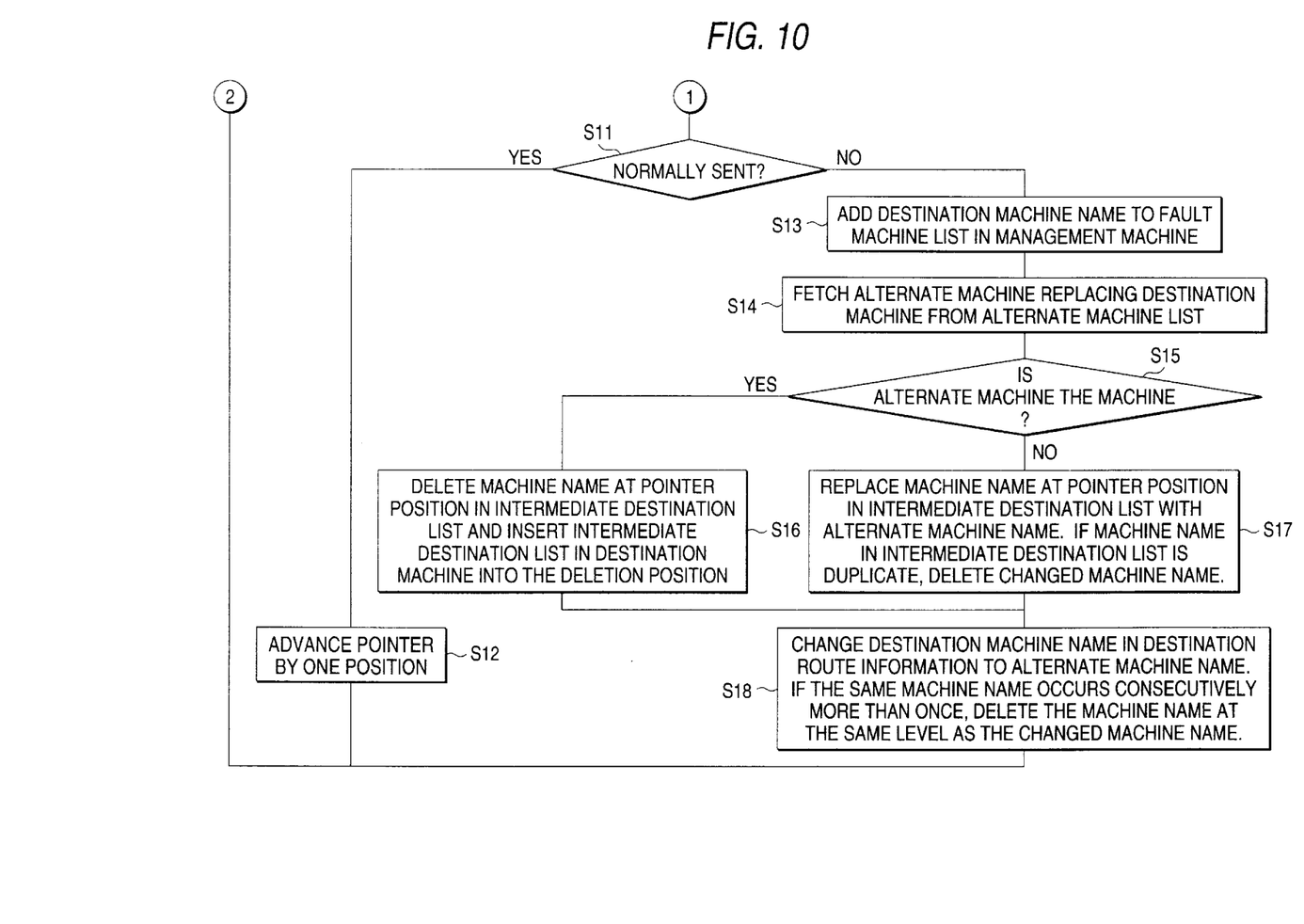
FIG. 10 is a flowchart showing a processing flow of the software automatic distribution system of the first embodiment according to the invention.

FIGS. 9 and 10 are flowcharts showing a processing flow of a software automatic distribution system of the first embodiment of the invention.

Since the machine 1 is the management machine at step S1, if the user defines the software main body to be distributed, the destination list in FIG. 4B, and the alternate machine list in FIG. 8 on the machine 1 at step S2, the management machine 1 stores the defined software main body, the defined destination list, and the defined alternate machine list in the storage section in the management machine 1. Next, the management machine 1 prepares the destination route information in FIG. 3A from the route information master in FIG. 2 and the destination list read from the storage section in the management machine 1 at step S3 and stores the prepared destination route information in the storage section. The destination route information is prepared by deleting all records of the destination machines in the route information master other than the destination machine 4, 5, or 9 in the destination list.

Figure 11:
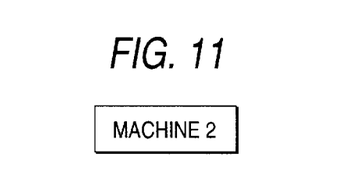
FIG. 11 shows an intermediate destination list used with the software automatic distribution system of the first embodiment according to the invention.

The management machine 1 prepares an intermediate destination list shown in FIG. 11 based on machine 2 of the record at level 1 in the destination route information read from the storage section at step S6. It places a pointer in the position of machine 2 at the top of the record of the prepared intermediate destination list at step S7. The management machine 1 assigns machine 2 of the machine name at the pointer position to the destination machine name at step S8 and determines whether or not the destination machine name is null at step S9. If the management machine 1 determines at step S9 that the destination machine name is not null, it distributes the software main body to be distributed, the destination route information, and the alternate machine list read from the storage section to the machine 2 of the destination machine name at step S10.

The management machine 1 determines whether or not the software main body, the destination route information, and the alternate machine list have been normally distributed to the machine 2 at step S11. If the management machine 1 determines at step S11 that they cannot be distributed normally because of some communication fault, it registers the machine 2 of the destination machine name where the distribution ended in failure in the fault machine list in the storage section at step S13. For example, the management machine 1 receives distribution result information indicating that software distribution ended in failure sent from the machine 2 and detects software distribution fault based on the distribution result information. The management machine 1 fetches machine 4 of the alternate machine replacing the machine 2 of the destination machine where the distribution ended in failure from the alternate machine list in the storage section at step S14 and determines whether or not the fetched alternate machine 4 is the management machine 1 at step S15. If the management machine 1 determines at step S15 that the alternate machine 4 is not the management machine 1, it changes machine 2 of the machine name at the pointer position in the intermediate destination list shown in FIG. 11 to machine 4 of the alternate machine name at step S17. At this change time, if the machine name in the intermediate destination list is duplicate, the management machine 1 deletes the changed machine name.

Figure 12:
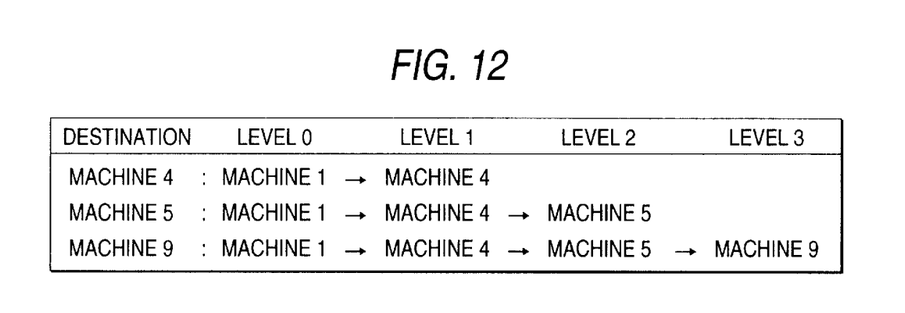
FIG. 12 shows destination route information used with the software automatic distribution system of the first embodiment according to the invention.

The management machine 1 changes machine 2 of the destination machine name in the destination route information in FIG. 3A to machine 4 of the alternate machine name at step S18 for changing the destination route information to that as shown in FIG. 12. At this change time, the machine names at levels 1 and 2 in the record of the machine 4 under the destination are both machine 4, thus the management machine 1 deletes the machine 4 of the machine name at level 2 in the record of the machine 4 under the destination at step S18 and returns to step S8. The management machine 1 fetches machine 4 of the machine name at the pointer position from the intermediate destination list in the storage section and assigns the machine 4 to the destination machine name at step S8 and determines whether or not the machine 4 of the destination machine name is null at step S9. If the management machine 1 determines at step S9 that the machine name is not null, it distributes the software main body, the destination route information in FIG. 12, and the alternate machine list in FIG. 8 to the machine 4 of the destination machine at step S10.

The management machine 1 determines whether or not the software main body, the destination route information, and the alternate machine list have been normally distributed to the machine 4 at step S11. If the management machine 1 determines at step S11 that they can be distributed normally, it advances the pointer by one position at step S12 and returns to step S8. The management machine 1 reads the machine name at the pointer position advanced by one position from the intermediate destination list and assigns the machine name to the destination machine name at step S8 and determines whether or not the destination machine name is null at step S9. If the management machine 1 determines at step S9 that the destination machine name is null, it terminates the distribution from the machine 1 to the machine 2, in fact, the alternate machine 4.

Steps S14 to S16 will be discussed. The management machine 1 fetches machine 4 of the alternate machine replacing the machine 2 of the destination machine where the distribution ended in failure from the alternate machine list in the storage section at step S14 and determines whether or not the fetched alternate machine 4 is the management machine 1 at step S15. If the management machine 1 determines at step S15 that the alternate machine 4 is the management machine 1, it changes the machine name at the pointer position in the intermediate destination list in FIG. 11 to machine 4, machine 5 of the machine name in the intermediate destination list in the destination machine 4, 5, 9 at step S16 and goes to step S18. Step S15 will be discussed specifically.

The management machine 1 prepares destination route information so that the machine 2 comes to level 0 of the top level from the destination route information in the machine 1 in FIG. 3A. Here, the machine 1 of the record at level 0 is deleted and the whole is shifted to the left. The management machine 1 fetches machine 4 and machine 5 of the record at level 1 in the prepared destination route information and prepares intermediate destination list.

Next, processing in the machine 4 where the software distribution from the machine 1 is complete will be discussed with reference to the flowcharts of FIGS. 9 and 10.

Figure 13:
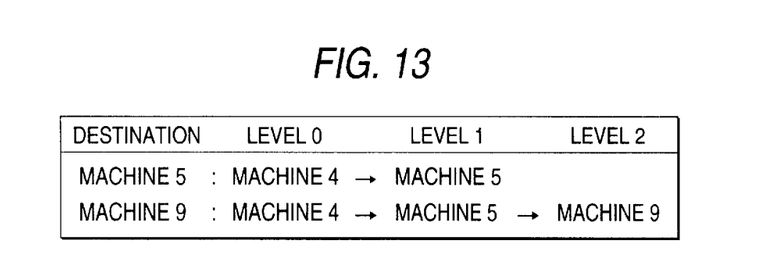
FIG. 13 shows destination route information used with the software automatic distribution system of the first embodiment according to the invention.

Since the machine 4 is not the management machine at step S1, when the machine 4 receives the software main body, the destination route information in FIG. 12, and the alternate machine list in FIG. 8 distributed from the machine 1 at step S4, it stores them in a storage section in the machine 4. The machine 4 corrects the destination route information in FIG. 12 read from the storage section so that the machine 4 becomes a machine at level 0 of the top level as shown in FIG. 13 at step S5 and stores the corrected destination route information in the storage section. Here, all entries of the machine 1 of the record at level 0 are deleted and the machine entries are shifted to the left so that machine 4 comes to level 0 of the top level of machine 4, 5, 9 under the destination, and the record of the machine 4 under the destination is deleted.

Figure 14:
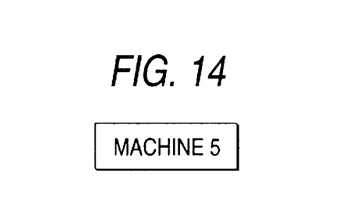
FIG. 14 shows an intermediate destination list used with the software automatic distribution system of the first embodiment according to the invention.

The machine 4 prepares an intermediate destination list shown in FIG. 14 based on machine 5 of the record at level 1 in the destination route information in FIG. 13 read from the storage section at step S6. It places a pointer in the position of machine 5 at the top of the record of the prepared intermediate destination list at step S7. The machine 4 assigns machine 5 of the machine name at the pointer position to the destination machine name at step S8 and determines whether or not the destination machine name is null at step S9. If the machine 4 determines at step S9 that the destination machine name is not null, it distributes the software main body to be distributed, the destination route information, and the alternate machine list read from the storage section to the machine 5 of the destination machine name at step S10.

The machine 4 determines whether or not the software main body, the destination route information, and the alternate machine list have been normally distributed to the machine 5 at step S11. If the machine 4 determines at step S11 that they have been distributed normally, it advances the pointer by one position at step S12 and returns to step S8. The machine 4 reads the machine name at the pointer position advanced by one position from the intermediate destination list and assigns the machine name to the destination machine name at step S8 and determines whether or not the destination machine name is null at step S9. If the machine 4 determines at step S9 that the destination machine name is null, it terminates the software distribution from the machine 4 to the machine 5.

Next, processing in the machine 5 where the software distribution from the machine 4 is complete will be discussed with reference to the flowcharts of FIGS. 9 and 10.

Figure 15:
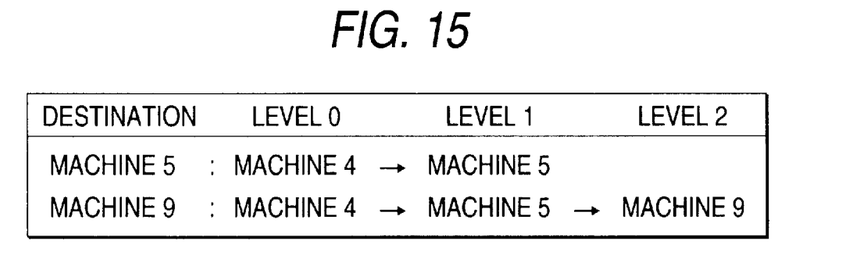
FIG. 15 shows destination route information used with the software automatic distribution system of the first embodiment according to the invention.
Figure 16:
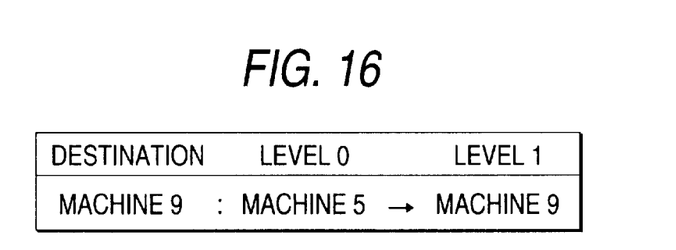
FIG. 16 shows destination route information used with the software automatic distribution system of the first embodiment according to the invention.

Since the machine 5 is not the management machine at step S1, when the machine 5 receives the software main body, destination route information in FIG. 15, and the alternate machine list in FIG. 8 distributed from the machine 4 at step S4, it stores them in a storage section in the machine 5. The machine 5 corrects the destination route information in FIG. 15 read from the storage section so that the machine 5 becomes a machine at level 0 of the top level as shown in FIG. 16 at step S5 and stores the corrected destination route information in the storage section. Here, all entries of the machine 4 of the record at level 0 are deleted and the machine entries are shifted to the left so that machine 5 comes to level 0 of the top level of machine 5, 9 under the destination, and the record of the machine 5 under the destination is deleted.

Figure 17:
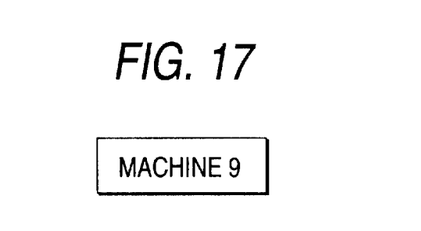
FIG. 17 shows an intermediate destination list used with the software automatic distribution system of the first embodiment according to the invention.

The machine 5 prepares an intermediate destination list shown in FIG. 17 based on machine 9 of the record at level 1 in the destination route information in FIG. 16 read from the storage section at step S6. It places a pointer in the position of machine 9 at the top of the record of the prepared intermediate destination list at step S7. The machine 5 assigns machine 9 of the machine name at the pointer position to the destination machine name at step S8 and determines whether or not the destination machine name is null at step S9. If the machine 5 determines at step S9 that the destination machine name is not null, it distributes the software main body to be distributed, the destination route information, and the alternate machine list read from the storage section to the machine 9 of the destination machine name at step S10.

The machine 5 determines whether or not the software main body, the destination route information, and the alternate machine list have been normally distributed to the machine 9 at step S11. If the machine 4 determines at step S11 that they have been distributed normally, it advances the pointer by one position at step S12 and returns to step S8. The machine 5 reads the machine name at the pointer position advanced by one position from the intermediate destination list and assigns the machine name to the destination machine name at step S8 and determines whether or not the destination machine name is null at step S9. If the machine 5 determines at step S9 that the destination machine name is null, it terminates the software distribution from the machine 5 to the machine 9.

Next, processing in the machine 9 where the software distribution from the machine 5 is complete will be discussed with reference to the flowcharts of FIGS. 9 and 10.

Figure 18:
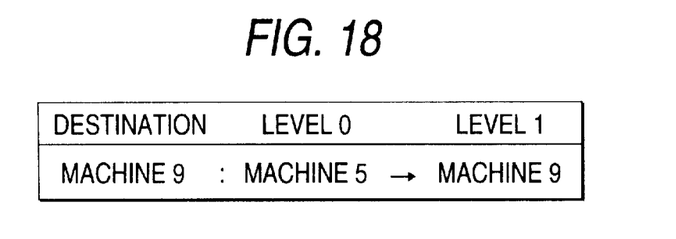
FIG. 18 shows destination route information used with the software automatic distribution system of the first embodiment according to the invention.

Since the machine 9 is not the management machine at step S1, when the machine 9 receives the software main body, destination route information in FIG. 18, and the alternate machine list in FIG. 8 distributed from the machine 5 at step S4, it stores them in a storage section in the machine 9. The machine 9 corrects the destination route information in FIG. 18 read from the storage section so that the machine 9 becomes a machine at level 0 of the top level at step S5. Here, the machine 5 of the record at level 0 is deleted and the machine entries are shifted to the left so that machine 9 comes to level 0 of the top level of machine 9 under the destination, and the record of the machine 9 under the destination is deleted. As a result, the destination route information becomes null.

The machine 9 prepares an intermediate destination list shown in FIG. 17 based on the null destination route information read from the storage section at step S6. Since the destination route information becomes null, the intermediate destination list also becomes null. The machine 9 places a pointer in the position of null at the top of the record of the prepared intermediate destination list at step S7. The machine 9 assigns null at the pointer position to the destination machine name at step S8 and determines whether or not the destination machine name is null at step S9. If the machine 9 determines at step S9 that the destination machine name is null, it terminates the software distribution.

Thus, in the embodiment, alternate machine information is registered in the alternate machine list in the storage section for each of the machines arranged hierarchically and when software is distribute from the management machine 1 to the machine 2, if the software distribution results in failure for some cause, the alternative machine 4 corresponding to the machine 2 where the software distribution results in failure is read from the alternate machine list in the storage section and the software is distributed to the read alternative machine 4, so that the software distribution route can be dynamically changed for automatically continuing the software distribution processing. Thus, software distribution can be executed in shorter time than was previously possible without manual labor for fault recovery or distribution route change or fruitless manual monitor; software distribution can be accomplished efficiently.

In the embodiment, when software distribution ended in failure, distirbution result information indicating that software distribution ended in failure is sent to the management machine 1, which then detects software distribution fault based on the received distirbution result information, whereby the management machine 1 of the software transmitting party can know software distribution fault efficiently in a short time as compared with the case where the management machine 1 requests the machine 2 to return distirbution result information. However, when software is distributed, if distirbution result information is not sent to the management machine 1 of the software transmitting party within a predetermined time, software distribution fault may be determined to occur. In this case, if distirbution result information is not sent to the management machine 1 of the software transmitting party, software distribution fault can also be reliably determined to occur.

In the first aspect of the invention, alternate machine information corresponding to the machines arranged hierarchically is previously stored in the alternate machine information storage means and when software is distributed from the first machine to the second machine, if the software distribution results in failure, the alternate machine information corresponding to the second machine where the software distribution results in failure is read from the alternate machine information storage means and software is distributed by the software distribution means based on the read alternate machine information, whereby the software distribution route can be dynamically changed for automatically continuing the software distribution processing. Thus, software distribution can be executed in shorter time than was previously possible without manual labor for fault recovery or distribution route change or fruitless manual monitor; software distribution can be accomplished efficiently.

In the second aspect of the invention, when software is distributed from the first machine to the second machine, if software distribution results in failure, the distribution result information indicating that software distribution ended in failure is sent from the second machine to the first machine and software distribution fault is detected based on the received distribution result information, whereby the first machine of the software transmitting party can know software distribution fault efficiently in a short time as compared with the case where the first machine requests the second machine to return the software distribution result.

In the third aspect of the invention, when software is distributed from the first machine to the second machine, if distribution result information is not sent to the first machine within a predetermined time, software distribution fault is determined to occur, whereby if distribution result information is not sent to the first machine of the software transmitting party, software distribution fault can also be reliably determined to occur.

What is claimed is:

1. An automatic software distribution system for distributing software to machines arranged hierarchically, at a plurality of levels, said automatic software distribution system comprising:

alternate machine information storage means for storing alternate machine information for distributing software to an alternate machine, corresponding to a second machine, if software distribution fails when software is distributed from a first machine to the second machine; and software distribution means for distributing software, based on the alternate machine information read from said alternate machine information storage means, to the alternate machine, if software distribution fails when software is distributed from the first machine to the second machine, wherein said alternate machine acts in place of the second machine to propagate software distribution to machines at lower levels, if software distribution fails when software is distributed from the first machine to the second machine.

2. The automatic software distribution system as claimed in claim 1 further including:

distribution result information notification means for sending distribution result information indicating that software distribution from the second machine to the first machine failed; and software distribution fault detection means for detecting a software distribution fault based on the distribution result information.

3. The automatic software distribution system as claimed in claim 1 further including software distribution fault determination means for determining a software distribution fault, if distribution result information is sent to the first machine within a time period after software is distributed from the first machine to the second machine.

* * * * *